United States Patent
Suzuki et al.

(10) Patent No.: US 11,997,568 B2
(45) Date of Patent: May 28, 2024

(54) SYSTEM AND METHOD FOR MANAGING ACCESS TO A PUSH-TO-TALK-OVER-CELLULAR COMMUNICATION NETWORK

(71) Applicant: BK Technologies Inc., West Melbourne, FL (US)

(72) Inventors: John Marvin Suzuki, Rockville, MD (US); Lorenzo Cruger, Jr., Boynton Beach, FL (US); James Lowell Teel, Jr., Lynchburg, VA (US)

(73) Assignee: BK TECHNOLOGIES INC., West Melbourne, FL (US)

( * ) Notice: Subject to any disclaimer, the term of this patent is extended or adjusted under 35 U.S.C. 154(b) by 0 days.

(21) Appl. No.: 17/844,488

(22) Filed: Jun. 20, 2022

(65) Prior Publication Data

US 2023/0232191 A1 Jul. 20, 2023

Related U.S. Application Data

(60) Provisional application No. 63/300,899, filed on Jan. 19, 2022.

(51) Int. Cl.
*H04W 4/10* (2009.01)
*H04W 4/08* (2009.01)
*H04W 8/20* (2009.01)

(52) U.S. Cl.
CPC ............ *H04W 4/10* (2013.01); *H04W 4/08* (2013.01); *H04W 8/20* (2013.01)

(58) Field of Classification Search
CPC ............ H04W 4/10; H04W 4/08; H04W 8/20
(Continued)

(56) References Cited

U.S. PATENT DOCUMENTS

| 7,499,720 B2 | 3/2009 | Idnani |
| 7,529,558 B1 | 5/2009 | Blair et al. |

(Continued)

FOREIGN PATENT DOCUMENTS

KR 100692639 B1 3/2007

OTHER PUBLICATIONS

Intl Journal of Electronics and Telecommunications, A Hybrid Extension for IP Multicasting in Push-to-talk over Cellular Systems, 2012, vol. 58, No. 1, 7 pgs., (pp. 77-83), http://ijet.pl/old_archives/2012/1/11.pdf.

(Continued)

*Primary Examiner* — Nghi H Ly
(74) *Attorney, Agent, or Firm* — Womble Bond Dickinson (US) LLP

(57) ABSTRACT

A method of managing access to a push-to-talk-over-cellular (POC) talkgroup may include providing a control device configured to manage a first talkgroup, granting a first non-subscriber device access to the first talkgroup, and transmitting, from the control device to the first non-subscriber device, a first communication including a link to download a POC software application configured to access the first talkgroup. A method of managing access to a push-to-talk-over-cellular (POC) talkgroup may alternatively include providing a control device configured to manage a first talkgroup, providing a first subscriber device, transmitting, from the first subscriber device to the control device, first non-subscriber contact information associated with a first non-subscriber device, and granting the first non-subscriber device access to the first talkgroup.

21 Claims, 8 Drawing Sheets

(58) Field of Classification Search
USPC .............. 370/329, 328, 338, 341, 345, 350
See application file for complete search history.

(56) References Cited

U.S. PATENT DOCUMENTS

| | | | |
|---|---|---|---|
| 7,801,494 B2 | 9/2010 | Emrich et al. | |
| 7,889,726 B2 | 2/2011 | Poikelkä et al. | |
| 8,331,971 B2 | 12/2012 | Turcanu | |
| 9,143,902 B2 | 9/2015 | Fu et al. | |
| 9,787,733 B2 | 10/2017 | Poikselka et al. | |
| 9,913,300 B2 | 3/2018 | Ayyasamy et al. | |
| 10,681,506 B1 | 6/2020 | Walker | |
| 2005/0233776 A1 | 10/2005 | Allen et al. | |
| 2006/0252442 A1* | 11/2006 | Nurmi ................ | G06F 3/04883 455/518 |
| 2007/0117552 A1* | 5/2007 | Gobburu .............. | H04W 84/08 455/414.1 |
| 2012/0036534 A1* | 2/2012 | Balestrieri .............. | H04L 65/70 725/40 |
| 2015/0326523 A1* | 11/2015 | Reilly .................... | H04L 51/02 709/206 |
| 2016/0065742 A1* | 3/2016 | Nasir ..................... | H04M 3/56 455/416 |
| 2017/0237600 A1* | 8/2017 | Patel ..................... | G06F 16/955 455/452.2 |
| 2018/0227342 A1 | 8/2018 | Bodilis | |
| 2018/0278718 A1* | 9/2018 | Brown ................... | H04L 67/34 |

OTHER PUBLICATIONS

Open Mobile Alliance Ltd., Push to talk over Cellular 2 Requirements, 2008, 95 pgs., https://www.openmobilealliance.org/release/PoC/V2_0-20080806-C/OMA-RD-PoC-V2_0-20080421-C.pdf.
International Search Report and Written Opinion issued in PCT/US2023/060814 dated Mar. 29, 2023, 9 pages.

* cited by examiner

SYSTEM AND METHOD FOR MANAGING ACCESS TO A PUSH-TO-TALK-OVER-CELLULAR COMMUNICATION NETWORK

CROSS-REFERENCE TO RELATED APPLICATIONS

This application claims priority to U.S. Provisional Application No. 63/300,899 filed Jan. 19, 2022, the entire contents of which are incorporated herein by reference.

BACKGROUND

Modern society relies on a number of different public safety agencies, such as fire departments, police departments, ambulance services, etc., to respond to emergency situations. In many situations, inter-agency coordination is critical to effectively responding and protecting the public. However, coordination may be hampered by the lack of communication interoperability between agencies. For example, different agencies may use different communication devices, or may operate on different channels and/or talkgroups. While steps have been made to standardize radio channels and talkgroups for public safety agencies, many times the lack of a common communications network and the unpredictable nature of public safety emergencies may still result in communication difficulties despite the efforts at standardization.

While it may be possible to set up customizable talkgroups for communication, such efforts may be prohibitively complex and time-consuming in an emergency situation. Additionally, such talkgroups would require management after the conclusion of the event to remove access to the talkgroup from devices where it is no longer needed, which may result in tedious and time-consuming management and record-keeping.

Recent years have seen the development of push-to-talk-over-cellular (POC) networks that may rival or surpass the coverage of traditional land mobile radio networks. Additionally, smartphones are widely owned and carried by many people, including public safety agency employees.

Accordingly, there may be a need for methods and systems to quickly and efficiently manage access to push-to-talk talkgroups, especially those that leverage the widespread availability of personal smartphones.

BRIEF SUMMARY

At least an exemplary embodiment of a method of managing access to a push-to-talk-over-cellular (POC) talkgroup may include providing a control device configured to manage a first talkgroup, granting a first non-subscriber device access to the first talkgroup, and transmitting, from the control device to the first non-subscriber device, a first communication including a link to download a POC software application configured to access the first talkgroup.

At least an exemplary method of managing access to a push-to-talk-over-cellular (POC) talkgroup may include providing a control device configured to manage a first talkgroup, providing a first subscriber device, transmitting, from the first subscriber device to the control device, first non-subscriber contact information associated with a first non-subscriber device, and granting the first non-subscriber device access to the first talkgroup.

At least an exemplary embodiment of a non-transitory computer-readable storage medium may include computer-executable instructions that, when executed by a computer, cause the computer to perform creating a first talkgroup for push-to-talk-over-cellular (POC) communication, receiving, from a first subscriber device, first non-subscriber contact information associated with a first non-subscriber device, and granting the first non-subscriber device access to the first talkgroup.

BRIEF DESCRIPTION OF THE SEVERAL VIEWS OF THE DRAWINGS

A more particular description will be rendered by reference to exemplary embodiments that are illustrated in the accompanying figures. Understanding that these drawings depict exemplary embodiments and do not limit the scope of this disclosure, the exemplary embodiments will be described and explained with additional specificity and detail through the use of the accompanying drawings in which.

Figure 1:
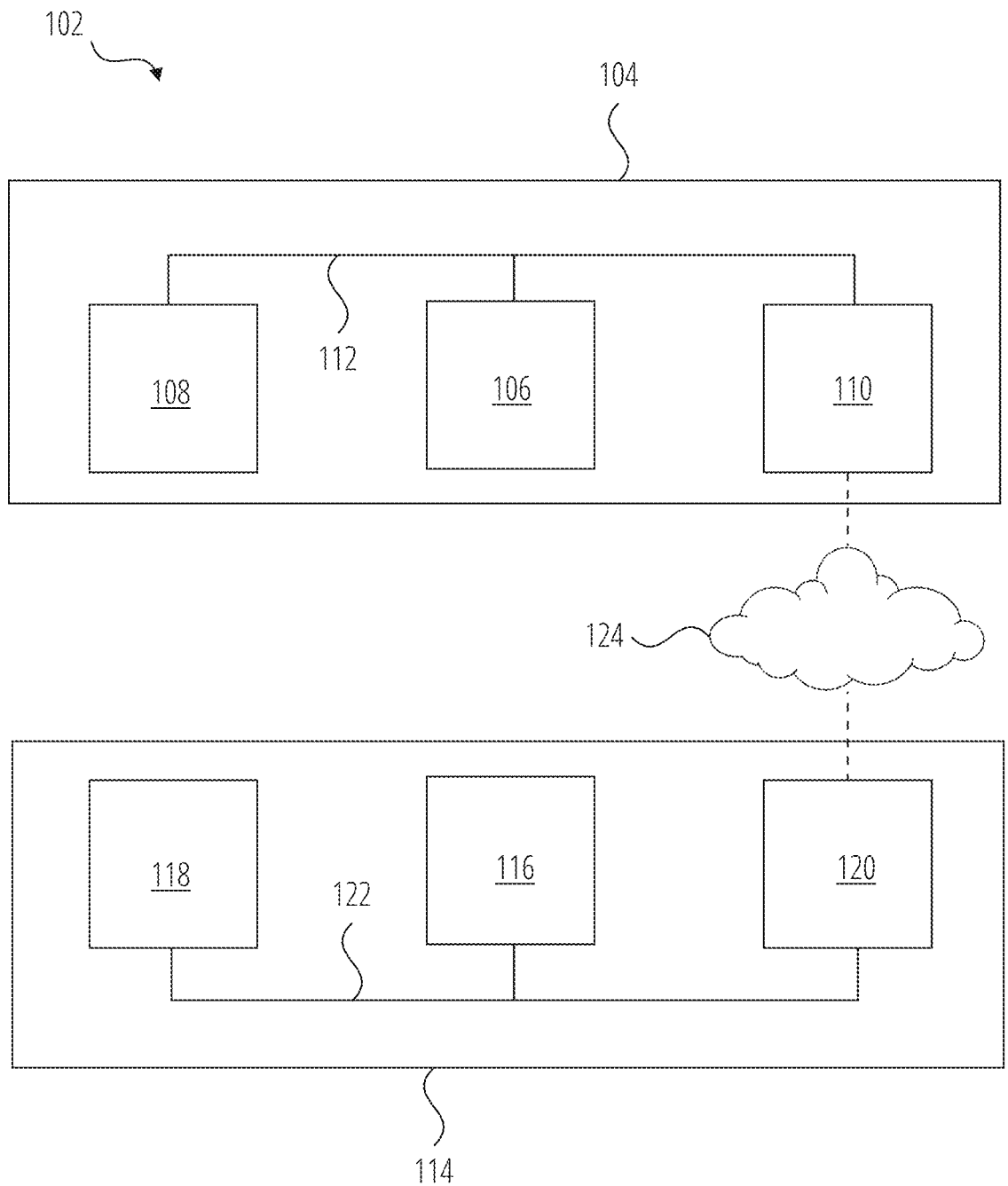
FIG. 1 is a schematic block diagram of a system according to an exemplary embodiment.

Various features, aspects, and advantages of the exemplary embodiments will become more apparent from the following detailed description, along with the accompanying drawings in which like numerals represent like components throughout the figures and detailed description. The various described features are not necessarily drawn to scale in the drawings but are drawn to aid in understanding the features of the exemplary embodiments.

The headings used herein are for organizational purposes only and are not meant to limit the scope of the disclosure or the claims. To facilitate understanding, reference numerals have been used, where possible, to designate like elements common to the figures.

DETAILED DESCRIPTION

Reference will now be made in detail to various exemplary embodiments. Each example is provided by way of explanation and is not meant as a limitation and does not constitute a definition of all possible embodiments. It is understood that reference to a particular "exemplary embodiment" of, e.g., a structure, assembly, component, configuration, method, etc. includes exemplary embodiments of, e.g., the associated features, subcomponents, method steps, etc. forming a part of the "exemplary embodiment."

FIG. 1 shows a schematic block drawings of an exemplary embodiment of a system 102 for managing access to a push-to-talk-over-cellular (POC) talkgroup. The system 102 may include a control device 104 and a first subscriber device 114 in communication with the control device 104. The control device 104 may be configured to perform administrative duties with respect to one or a plurality of POC talkgroups, including a first talkgroup. For example, the control device 104 may control which non-subscriber devices have access to the talkgroups managed by the control device 104.

In an exemplary embodiment, the phrase "subscriber device" may refer to a device that subscribes to a service provided by an operator of the control device 104. For example, the operator of the control device 104 may provide a POC service for facilitating POC communication between various devices. In contrast, the phrase "non-subscriber device" may refer to a device that does not subscribe to the service provided by the operator of the control device 104. The non-subscriber device may subscribe to a different POC service than the service provided by the operator of the control device 104, or the non-subscriber device may not subscribe to any POC service at all and may not even have any POC software installed on the device. As explained further hereinbelow, at least an exemplary embodiment includes providing a link to download POC software compatible with the talkgroup(s) managed by the control device 104.

In an exemplary embodiment, the control device 104 may be a server that is accessible via communication over internet 124. The control device 104 may further include a control device processor 106, a control device memory 108, and a control device communication module 110, which may be mutually operably coupled to each other via a control device bus 112. The control device communication module 110 may include hardware components that allow the control device 104 to communicate with other devices, either locally or via a network such as the internet 124. For example, the control device communication module 110 may include an ethernet connection, wireless LAN connection, and/or other hardware configured for communication over the internet 124. The control device processor 106, the control device memory 108, and the control device communication module 110 may be mutually operably coupled via a control device bus 112. The control device memory 108 may be a non-transitory computer-readable medium or media that stores computer-executable instructions thereon. The computer-executable instructions stored in the control device memory 108 may be executed by the control device 104; in an exemplary embodiment, the computer-executable instructions may be executed by the control device processor 106. Once executed, the computer-executable instructions may cause the control device 104 to perform steps consistent with the processes and methods described herein below.

The first subscriber device 114 may be configured to communicate with the control device 104 via the internet 124. In various exemplary embodiments, the first subscriber device 114 may be a cellular telephone (e.g. a smart phone), a tablet computer, a laptop computer, or a desktop computer. Generally, the first subscriber device 114 may be used by a person with administrative rights with respect to the first talkgroup. The first subscriber device 114 may include a subscriber device processor 116, a subscriber device memory 118, and a subscriber device communication module 120. Similar to the control device communication module 110 described above, the subscriber device communication module 120 may include hardware components that allow the first subscriber device 114 to communicate with the control device 104 via the internet 124. For example, the subscriber device communication module 120 may include an ethernet connection, wireless LAN connection, broadband cellular antenna and related hardware, and/or other hardware configured for communication over the internet 124. The subscriber device processor 116, the subscriber device memory 118, and the subscriber device communication module 120 may be mutually operably coupled via a subscriber device bus 122.

It will be understood that FIG. 1 is not intended to demonstrate a specific physical arrangement of the hardware of the control device 104 or the first subscriber device 114, but is instead intended as a conceptual representation to show what structures may be present in exemplary embodiments of the control device 104 and the first subscriber device 114. It will be further understood that the control device 104 and the first subscriber device 114 are not limited to the specifically illustrated connections between the components. For example, in exemplary embodiments, certain components may be operably coupled to the control device processor 106 or the subscriber device processor 116 without direct connection to other components.

Figure 2:
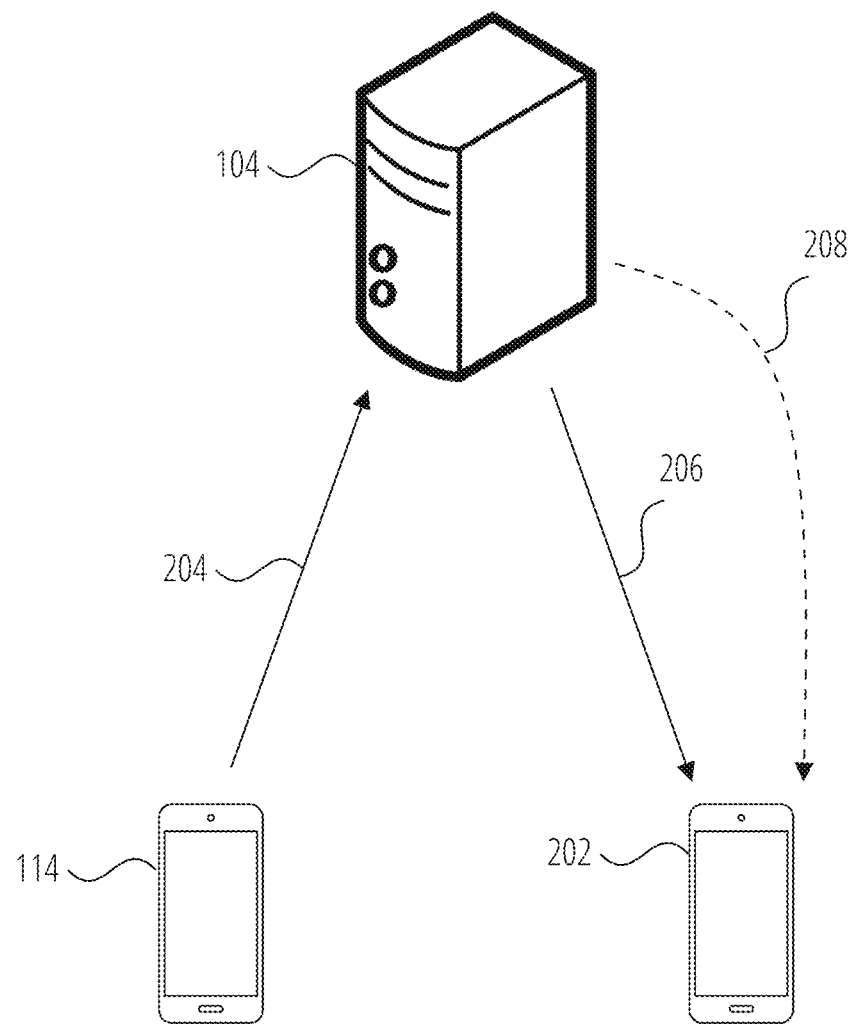
FIG. 2 is a schematic diagram of a system according to an exemplary embodiment.

FIG. 2 is a schematic diagram showing an exemplary embodiment of how the system 102 may be used to manage a POC talkgroup. For example, in an emergency incident, a first responder (hereinafter referred to as an administrator) such as a senior police officer or senior firefighter may have control of the first subscriber device 114. In the context of FIG. 2, the first subscriber device 114 is illustrated as a smartphone, but it will be understood that the disclosure is not limited to this. For example, in another exemplary embodiment, the first subscriber device 114 may be a tablet, laptop computer, desktop computer, or other device, and may be operated by a dispatcher or senior officer at a command post. The administrator may have administrative privileges with respect to a preexisting first talkgroup or may create a new first talkgroup on an ad hoc basis.

Another first responder (hereinafter referred to as a client), owning a first non-subscriber device 202, may arrive on the scene and may need to communicate with other first responders. The first non-subscriber device 202 may be a device configured to communicate via a broadband cellular network, such as a cellular telephone (e.g. a smartphone) or a tablet computer. The administrator may send a command 204 to the control device 104 including first non-subscriber contact information associated with the first non-subscriber device 202. The command may be entered via a software application running on the first subscriber device 114 and configured for interfacing with the control device 104. For example, the software application may have a user interface where the administrator can enter the first non-subscriber contact information. In some embodiments, entering the first non-subscriber contact information may be by manual entry of the first non-subscriber contact information. In some embodiments, entering non-subscriber contact information may be by selection of specific non-subscriber contact information (e.g. associated with a specific non-subscriber device, such as the first non-subscriber device 202) from pre-entered non-subscriber contact information (e.g. by selection from a menu of pre-entered contact information). In some embodiments, the pre-entered contact information may include information (such as telephone numbers) from the administrator/subscriber's general contact list (e.g. on their cellphone and/or first subscriber device 114) and/or information from a non-subscriber list (for example, in a database or spreadsheet or otherwise on or available through the first subscriber device 114), which may include information built over time, such as non-subscribers that were previously invited to participate. The first non-subscriber contact information may be a cellular telephone number, email address, or other identifying information linked to the first non-subscriber device 202 and/or the client using the first non-subscriber device 202. The command 204 may further include instructions to grant the first non-subscriber device 202 access to the first talkgroup, and the command 204 may further indicate a predetermined period of time for access to the first talkgroup. The predetermined period of time may have a default value, or the predetermined period of time may be settable via first subscriber device 114.

In response to the command 204, the control device 104 may grant the first non-subscriber device 202 access to the first talkgroup. Further, the control device 104 may send a first communication 206 to the first non-subscriber device 202 notifying it that access has been granted to first talkgroup. The first communication 206 may be a text message, email message, or message sent via another suitable communication protocol. The first communication 206 may include first configuration information associated with the first talkgroup. The first configuration information may include any information and/or parameters necessary for communicating via the first talkgroup. For example, the first configuration information may be a file for use by a software application on first non-subscriber device 202, such that the file may instruct the software application to display and/or communicate via the first talkgroup. Additionally, the first communication 206 may include a link for downloading a POC software application for POC communication. Thus, even if the first non-subscriber device 202 was not previously configured for POC communications, the first communication 206 will provide the first non-subscriber device 202 with the means for accessing the first talkgroup to which it has been granted access.

After the predetermined period of time has expired, the control device 104 may revoke access of the first non-subscriber device 202 to the first talkgroup. In an exemplary embodiment, the control device 104 may be configured and/or programmed to revoke the access to the first talkgroup automatically with no human interaction required. In an exemplary embodiment, the control device 104 may send a second communication 208 to the first non-subscriber device 202 instructing the first non-subscriber device 202 to remove the first talkgroup from the POC software on the first non-subscriber device 202. In an alternative exemplary embodiment, control device 104 may be configured such that the administrator can terminate the first talkgroup via an affirmative command entered into the first subscriber device 114. In another alternative exemplary embodiment, the control device 104 may be configured to terminate the first talkgroup after a predetermined period of no activity within the first talkgroup.

Figure 3:
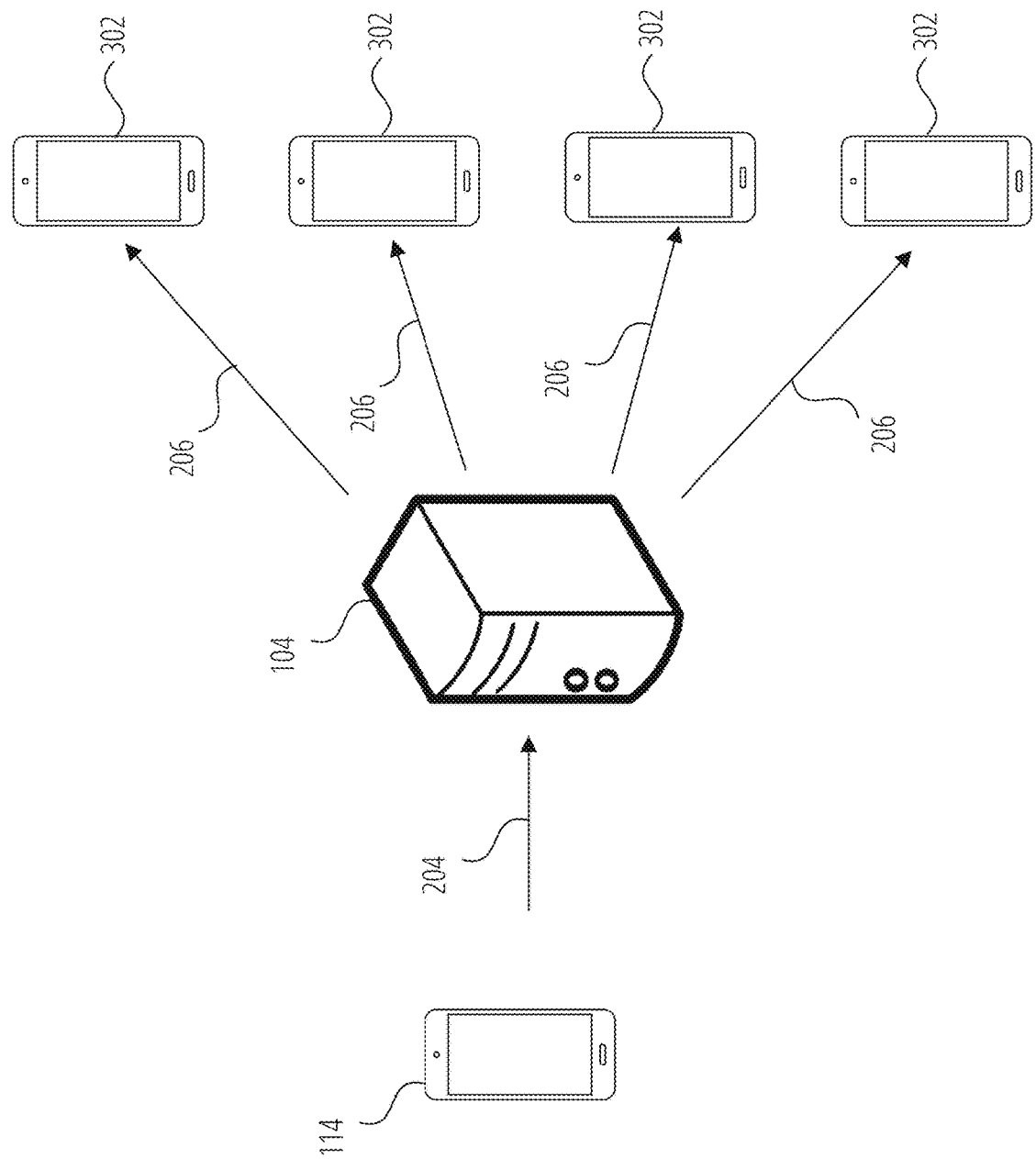
FIG. 3 is a schematic diagram of a system according to an exemplary embodiment.

FIG. 3 is a schematic diagram showing another exemplary embodiment of how the system 102 may be used to manage a POC talkgroup. Similar to the embodiment shown in FIG. 2, in FIG. 3 the first subscriber device 114 may send the command 204 to the control device 104. The main difference between FIG. 2 and FIG. 3 is that in FIG. 3, there are a plurality of non-subscriber devices 302. Each of the plurality of non-subscriber devices 302 may have its own non-subscriber contact information, such as a cellular telephone number. Accordingly, the administrator may enter multiple telephone numbers into the software application on the first subscriber device 114, each telephone number corresponding to one of the plurality of non-subscriber devices 302. In some embodiments, entering the non-subscriber contact information may be by manual entry of the first non-subscriber contact information. In some embodiments, entering non-subscriber contact information (e.g. telephone numbers) may be by selection of specific non-subscriber contact information (e.g. associated with a specific non-subscribe device) from pre-entered non-subscriber contact information (e.g. by selection from a menu of pre-entered contact information, for example on the software application, such as subscribers previously invited to participate via the system or software application, and/or from the administrator's contact list on their first subscriber device 114, such as a cellphone). The control device 104 may then grant access to the first talkgroup to each of the plurality of non-subscriber devices 302 for the predetermined period of time, and the control device 104 may further send the first communication 206 to each of the plurality of non-subscriber devices 302. After the predetermined amount of time has expired, the control device 104 may revoke the access to the first talkgroup for each of the plurality of non-subscriber devices 302. Alternatively, the first talkgroup may be terminated via an affirmative command or by lack of activity for a predetermined period of time.

The description above describes the control device 104 in terms of managing the first talkgroup. However, it will be understood that the disclosure is not limited to just a single talkgroup. For example, in an exemplary embodiment, the first talkgroup may be one of a plurality of talkgroups. In this situation, the first communication 206 from the control device 104 to the first non-subscriber device 202 or the plurality of non-subscriber devices 302 may include configuration information for each talkgroup of the plurality of talkgroups. Further, the control device 104 may grant access to one, several, or all of the talkgroups in the plurality of talkgroups to each of the first non-subscriber device 202 or the plurality of non-subscriber devices 302. Additionally, in an exemplary embodiment, multiple talkgroups may be linked together as part of a single virtual incident. Each individual talkgroup may be configured to facilitate communication between particular groups during an incident. For example, the multiple talkgroups may correspond to different types of responders at an incident, such as a talk group for fire personnel, a talkgroup for law enforcement personnel, a talkgroup for medical personnel, etc. Alternatively, the multiple talkgroups may be geographically based, such as all emergency personnel in a first geographic area, all emergency personnel in a second geographic area, etc. Similarly, once the predetermined time has expired, access to the plurality of talkgroups may be automatically revoked by the control device 104.

Figure 4:
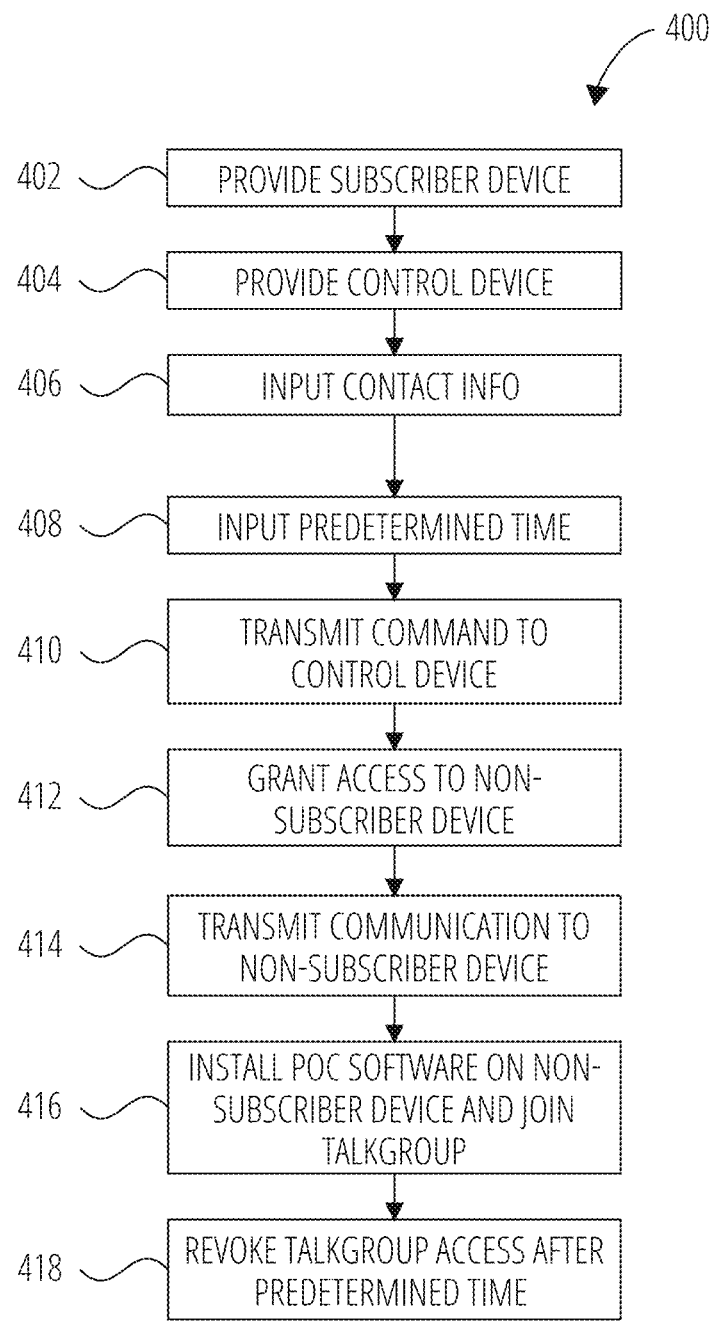
FIG. 4 is a flowchart illustrating a method according to an exemplary embodiment.

FIG. 4 is a flowchart illustrating an exemplary embodiment of a method for managing access to a POC talkgroup. In block 402, a subscriber device is provided. The subscriber device may be the first subscriber device 114 as described above. In block 404, a control device is provided. The control device may be the control device 104 as described above. The subscriber device and the control device may be configured to communicate via the internet.

In block 406, non-subscriber contact information is input into the subscriber device. In an exemplary embodiment, the non-subscriber contact information may be a cellular telephone number, email address, or other information that can identify a user. In some embodiments, inputting the first non-subscriber contact information may be by manual entry of the first non-subscriber contact information. In some embodiments, inputting non-subscriber contact information may be by selection of specific non-subscriber contact information (e.g. associated with a specific non-subscriber) from pre-entered non-subscriber contact information (e.g. by selection from a menu of pre-entered contact information and/or from the administrator's contact list on their first subscriber device 114, such as a cellphone). Additional methods of inputting non-subscriber contact information into the subscriber device are included within the scope herein. In block 408, a predetermined time for access to a talkgroup may be entered into the subscriber device.

In block 410, the subscriber device may transmit a command to the control device. The command may include the non-subscriber contact information, a list of one or more talkgroups to which access is to be granted, and/or the predetermined time. In block 412, the control device may then manage the desired talkgroup(s) to grant access to the device associated with the non-subscriber contact information.

In block 414, the control device may transmit a communication to the non-subscriber device. The communication may include a link to download a software application that can communicate with the POC talkgroup if the non-subscriber device does not already include the software, as well as information sufficient to populate the software application with the talkgroup(s).

In block 416, the non-subscriber device may install the POC software application, if necessary, and join the POC talkgroup. In block 418, the control device may revoke talkgroup access for the non-subscriber device after the predetermined time has elapsed. The control device may also transmit a communication to the non-subscriber device removing the talkgroup from the software application on the non-subscriber device. Additionally, the control device may transmit a communication to the non-subscriber device that includes instructions to delete the POC software application from the non-subscriber device.

Figure 5:
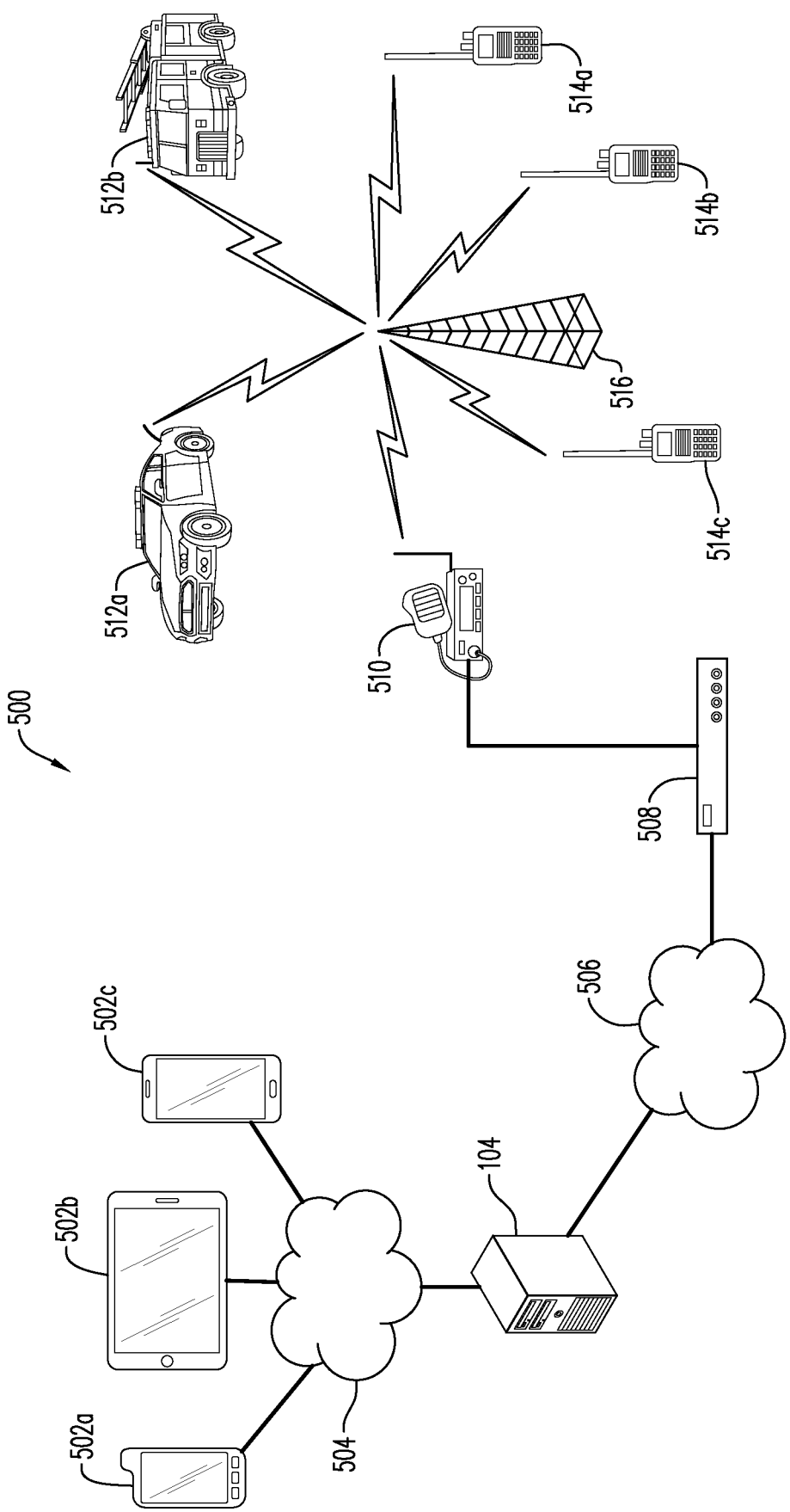
FIG. 5 is a schematic diagram of a system according to an exemplary embodiment.

In certain situations, it may be advantageous to join a whole group of land mobile radio (LMR) users to the talkgroup(s) managed by the control device 104. For example, a first jurisdiction may have an emergency situation that requires assistance from a fire department from a second jurisdiction. If the second jurisdiction fire department already has an LMR network and LMR devices configured for its members, it may be more efficient to simply join the entire LMR network to the talkgroups managed by the control device 104, instead of joining individual non-subscriber devices. FIG. 5 shows an exemplary embodiment of a system 500 for POC communication in such a situation.

In the system 500, there may be a predefined group of LMR users using devices such as mobile LMR devices 512a, 512b and handheld LMR devices 514a, 514b, 514c. Mobile LMR devices 512a, 512b and handheld LMR devices 514a, 514b, 514c may be in mutual communication via an LMR repeater system 516. The LMR repeater system 516 may further be in communication with a donor radio 510 operably coupled to an LMR gateway such as a radio gateway 508. The radio gateway 508 may communicate with the donor radio 510 via tone signaling or a proprietary signaling regime. The donor radio 510 may be an LMR device similar to the mobile LMR device 512a or the handheld LMR device 514a and be specifically configured as an access point between the radio gateway 508 and the LMR repeater system 516. The radio gateway 508 may be configured to communicate with an IP network 506 (such as the Internet). The radio gateway 508 may be a purpose-built device specifically designed for communicating with LMR devices and IP networks, or, alternatively, the radio gateway 508 may be a general-use PC running software configured to serve as a gateway. The radio gateway 508 may be in communication with the control device 104 via the IP network 506. As described above, the control device 104 may manage one or more POC talkgroups 504, and POC devices 502a, 502b, 502c may be configured to communicate via the POC talkgroups 504. Thus, the system 500 allows for LMC-POC communication between, on one side, a preexisting group comprising mobile LMR devices 512a, 512b and handheld LMR devices 514a, 514b, 514c, and, on the other side, POC devices 502a, 502b, 502c, via the control device 104, the radio gateway 508, and the donor radio 510, thereby adding addition flexibility and utility to first responders' communications systems.

Figure 6:
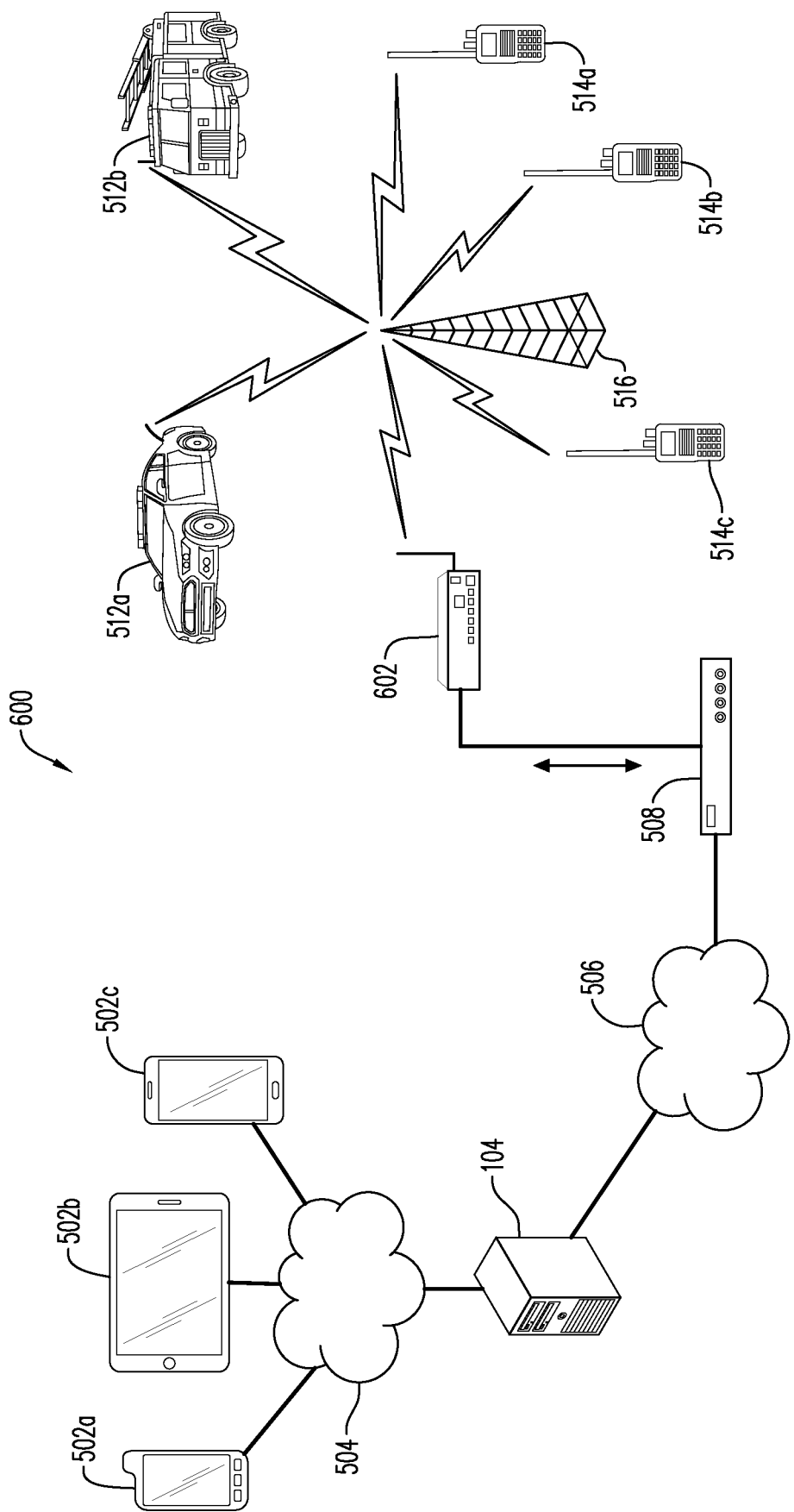
FIG. 6 is a schematic diagram of a system according to an exemplary embodiment.
Figure 7:
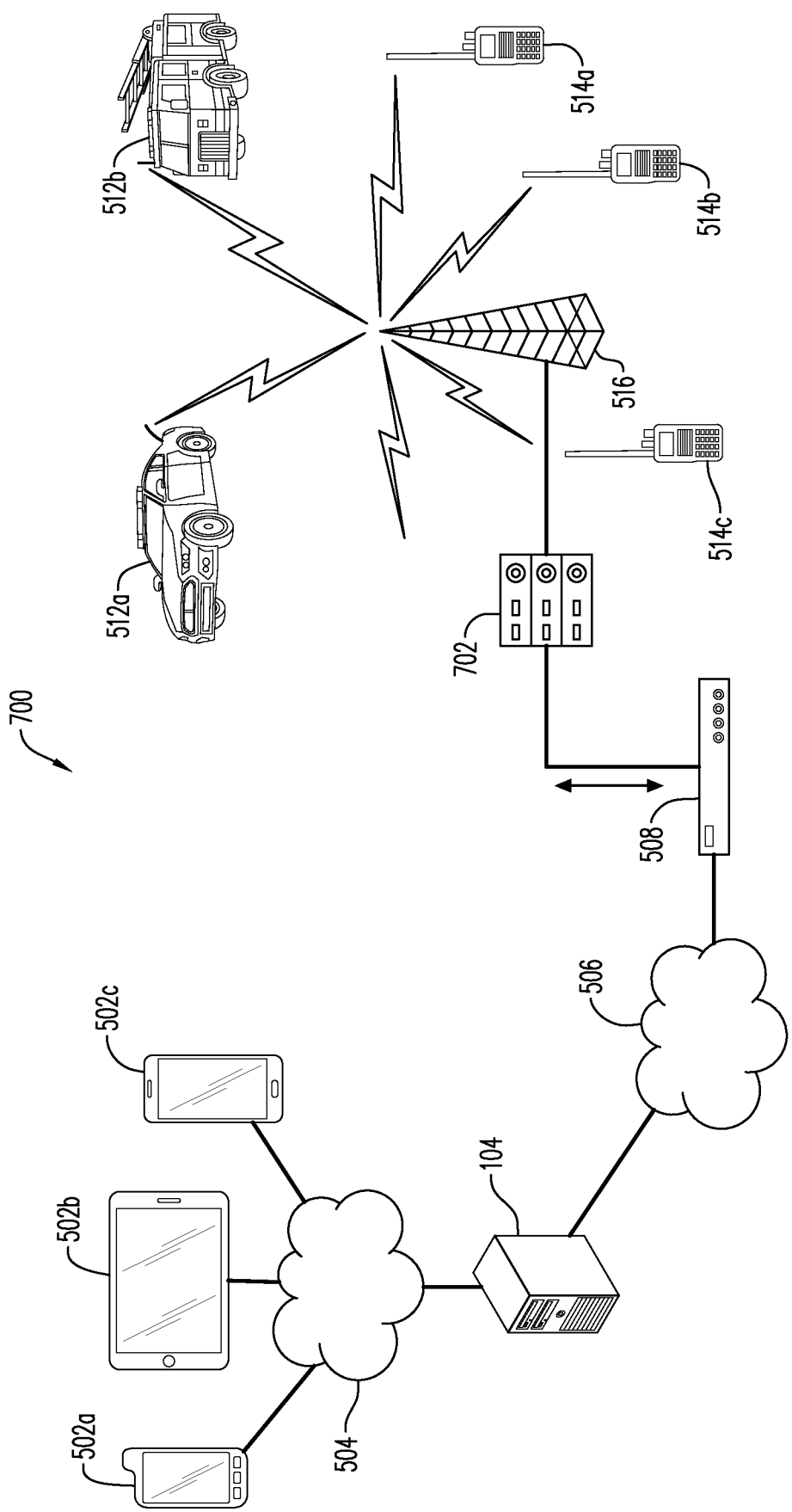
FIG. 7 is a schematic diagram of a system according to an exemplary embodiment.
Figure 8:
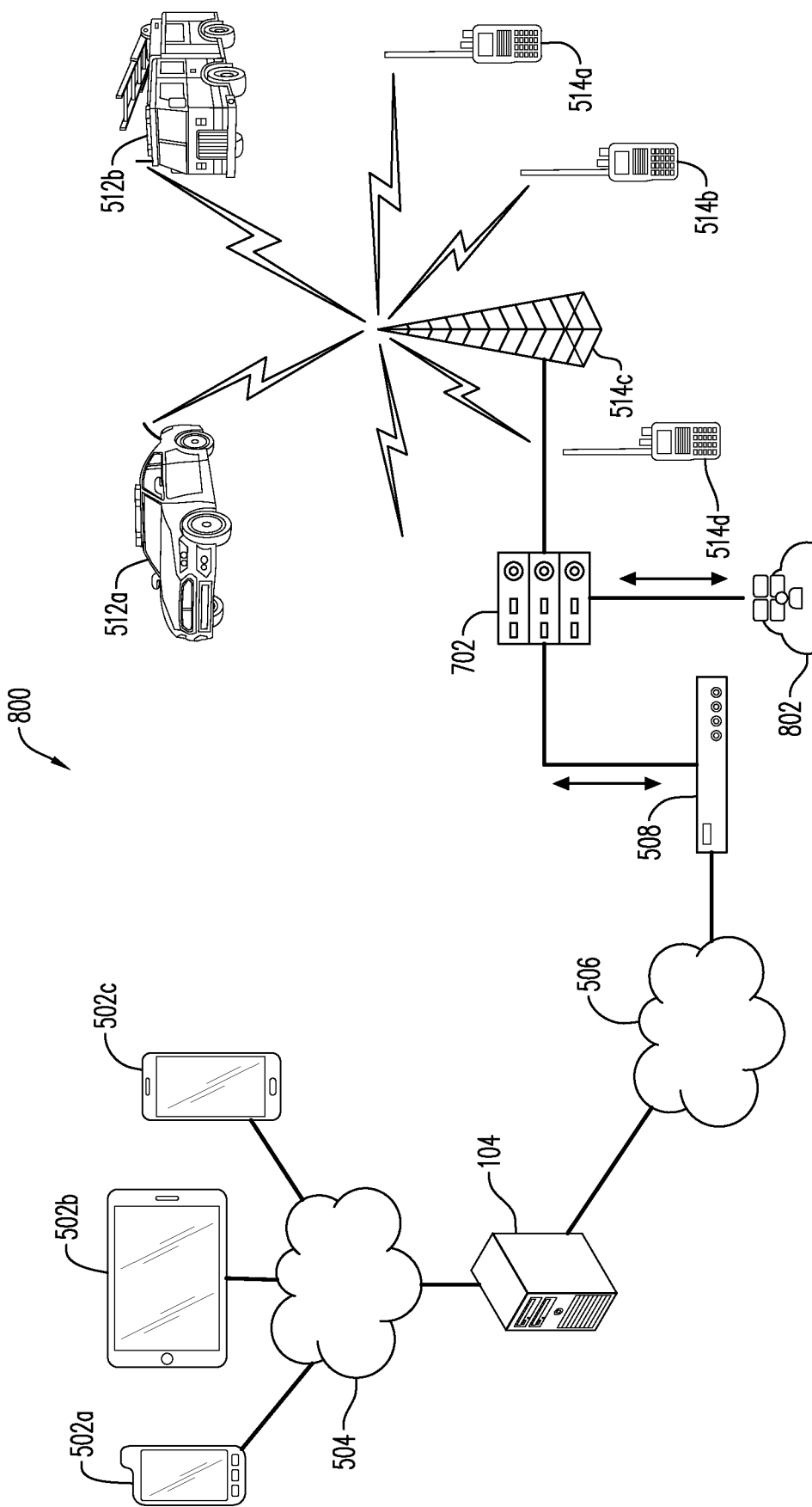
FIG. 8 is a schematic diagram of a system according to an exemplary embodiment.

It will be understood that the systems and methods of the present disclosure are not limited to the system 500 shown in FIG. 5, and instead are broadly applicable to any LMR system that can be linked to an IP network 506. For example, FIG. 6 shows an embodiment of a system 600 in which the donor radio 510 of FIG. 5 is replaced by a P25 station 602 as the LMR gateway. The term P25 refers to the Project 25 suite of standards for interoperable digital two-way radio products. FIG. 7 shows an exemplary embodiment of a system 700 in which a P25 core 702 serves as the LMR gateway to the IP network 506. FIG. 8 shows an exemplary embodiment of a system 800 using the P25 core 702 along with the addition of a P25 console subsystem 802 for additional connectivity and functionality.

A common feature among the system 500, the system 600, the system 700, and the system 800 is that it allows for LMR device users to be invited to and join the POC talkgroups 504 managed by the control device 104. In at least an embodiment described above, the administrator may enter non-subscriber contact information for inviting a non-subscriber device. In contrast, in an embodiment using one of the system 500, the system 600, the system 700, and the system 800, the administrator may enter identifying information of the LMR gateway, such as an IP address. Once the IP address of the LMR gateway is entered, any LMR devices on the corresponding LMR network will have access to the POC talkgroups 504. Alternatively, depending on the capabilities of the specific LMR gateway being used, it may be possible to selectively limit access to the POC talkgroups 504 to individual devices of the LMR network. Access to the POC talkgroups 504 may be terminated in the same fashion as described hereinabove, i.e., after passage of a predetermined time, an affirmative command by an administrator, or lack of activity in the POC talkgroups 504.

In the various embodiments described above, reference is made to non-subscriber devices. It will be understood that this is not meant to limit in any way the embodiments described above as only for use with non-subscriber devices. For example, it will be understood that other subscriber devices may also be invited to join talkgroups managed by the control device in addition to or as an alternative to the non-subscriber devices.

The exemplary embodiments of a method and system described above may provide significant advantages over conventional solutions. For example, certain emergency situations may require coordinated responses from several different agencies, possibly from multiple different jurisdictions. The agencies may each use different communication hardware, and/or may be configured to communicate on different talkgroups and channels, which could make coordination difficult. Embodiments of the system and method described above may allow users to quickly set up ad hoc talkgroups in the field for interagency communication, without required complicated administrative procedures. This would allow for more time and attention to be devoted to responding to the emergency situation. Additionally, automatically revoking access to the talkgroup after a predetermined period of time may help to reduce cluttered population of talkgroups and reduce the manpower required for administering a talkgroup. Further, automatically revoking access to talkgroups may help to maintain the integrity and security of agency talkgroups by reducing the likelihood of unauthorized access after the emergency situation has passed.

This disclosure, in various embodiments, configurations and aspects, includes components, methods, processes, systems, and/or apparatuses as depicted and described herein, including various embodiments, sub-combinations, and subsets thereof. This disclosure contemplates, in various embodiments, configurations and aspects, the actual or optional use or inclusion of, e.g., components or processes as may be well-known or understood in the art and consistent with this disclosure though not depicted and/or described herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while considering that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that the appended claims should cover variations in the ranges except where this disclosure makes clear the use of a particular range in certain embodiments.

The terms "determine", "calculate" and "compute," and variations thereof, as used herein, are used interchangeably and include any type of methodology, process, mathematical operation or technique.

This disclosure is presented for purposes of illustration and description. This disclosure is not limited to the form or forms disclosed herein. In the Detailed Description of this disclosure, for example, various features of some exemplary embodiments are grouped together to representatively describe those and other contemplated embodiments, configurations, and aspects, to the extent that including in this disclosure a description of every potential embodiment, variant, and combination of features is not feasible. Thus, the features of the disclosed embodiments, configurations, and aspects may be combined in alternate embodiments, configurations, and aspects not expressly discussed above. For example, the features recited in the following claims lie in less than all features of a single disclosed embodiment, configuration, or aspect. Thus, the following claims are hereby incorporated into this Detailed Description, with each claim standing on its own as a separate embodiment of this disclosure.

Advances in science and technology may provide variations that are not necessarily expressed in the terminology of this disclosure although the claims would not necessarily exclude these variations.

What is claimed is:

1. A method of managing access to a push-to-talk-over-cellular (POC) talkgroup, the method comprising:
   providing a control device configured to:
      provide a POC service; and
      manage a first POC talkgroup;
   granting a first non-subscriber device access to the POC service and the first POC talkgroup such that the first non-subscriber is permitted to join the first POC talkgroup and communicate via the first POC talk group using the POC service; and
   transmitting, from the control device to the first non-subscriber device, a first communication including a link to download a POC software application configured to join the first POC talkgroup and communicate via the first POC talkgroup using the POC service.

2. The method of claim 1, further comprising automatically revoking access of the first non-subscriber device to the first POC talkgroup after a predetermined period of time has elapsed.

3. The method of claim 1, further comprising:
   providing a first subscriber device; and
   transmitting, from the first subscriber device to the control device, first non-subscriber contact information associated with the first non-subscriber device.

4. The method of claim 3, further comprising:
   setting a predetermined period of time via the first subscriber device; and
   automatically revoking access of the first non-subscriber device to the first POC talkgroup after the predetermined period of time has elapsed.

5. The method of claim 3, wherein:
   the first non-subscriber device is a cellular device; and
   the first non-subscriber contact information is a first cellular telephone number.

6. The method of claim 1, wherein:
   the first non-subscriber device is one of a plurality of non-subscriber devices;

the granting the first non-subscriber device access to the first POC talkgroup comprises granting the plurality of non-subscriber devices access to the first POC talkgroup; and the transmitting the first communication comprises transmitting the first communication to each non-subscriber device of the plurality of non-subscriber devices.

7. The method of claim 1, wherein:
the first POC talkgroup is one of a plurality of POC talkgroups; and
each POC talkgroup of the plurality of POC talkgroups is linked as part of a single virtual incident.

8. A method of managing access to a push-to-talk-over-cellular (POC) talkgroup, the method comprising:
providing a control device configured to:
provide a POC service; and
manage a first POC talkgroup;
providing a first subscriber device;
transmitting, from the first subscriber device to the control device, first non-subscriber contact information associated with a first non-subscriber device;
granting the first non-subscriber device access to the POC service and the first POC talkgroup such that the first non-subscriber device is permitted to join the first POC talkgroup and communicate via the first POC talkgroup using the POC service; and
transmitting, from the control device to the first non-subscriber device, a first communication including a link to download a POC software application configured to join the first POC talkgroup and communicate via the first POC talkgroup using the POC service.

9. The method of claim 8, further comprising automatically revoking access of the first non-subscriber device to the first POC talkgroup after a predetermined period of time has elapsed.

10. The method of claim 8, further comprising:
setting a predetermined period of time via the first subscriber device; and
automatically revoking access of the first non-subscriber device to the first POC talkgroup after the predetermined period of time has elapsed.

11. The method of claim 8, wherein:
the first non-subscriber device is a cellular device; and
the first non-subscriber contact information is a first cellular telephone number.

12. The method of claim 8, wherein:
the first non-subscriber device is a land mobile radio (LMR) gateway; and
the first non-subscriber contact information is an internet protocol address of the LMR gateway.

13. The method of claim 8, wherein:
the first non-subscriber device is one of a plurality of non-subscriber devices;
the transmitting, from the first subscriber device to the control device, first non-subscriber contact information associated with a first non-subscriber device comprises transmitting, from the first subscriber device to the control device, non-subscriber contact information associated with each non-subscriber device of the plurality of non-subscriber devices; and
the granting the first non-subscriber device access to the first POC talkgroup comprises granting the plurality of non-subscriber devices access to the first POC talkgroup.

14. The method of claim 8, wherein:
the first POC talkgroup is one of a plurality of POC talkgroups; and
each POC talkgroup of the plurality of POC talkgroups is linked as part of a single virtual incident.

15. A non-transitory computer-readable storage medium comprising computer-executable instructions that, when executed by a computer, cause the computer to perform:
provide a push-to-talk-over cellular (POC) service;
creating a first POC talkgroup for POC communication;
receiving, from a first subscriber device, first non-subscriber contact information associated with a first non-subscriber device;
granting the first non-subscriber device access to the POC first talkgroup such that the first non-subscriber device is permitted to join the first POC talkgroup and communicate via the first POC talkgroup using the POC service; and
transmitting, to the first non-subscriber device, a first communication including a link to download a POC software application configured to join the first POC talkgroup and communicate via the first POC talkgroup using the POC service.

16. The non-transitory computer-readable storage medium of claim 15, wherein the computer-executable instructions further cause the computer to perform:
automatically revoking access of the first non-subscriber device to the first POC talkgroup after a predetermined period of time has elapsed.

17. The non-transitory computer-readable storage medium of claim 15, wherein the computer-executable instructions further cause the computer to perform:
receiving a predetermined period of time setting from the first subscriber device; and
automatically revoking access of the first non-subscriber device to the first POC talkgroup after the predetermined period of time has elapsed.

18. The non-transitory computer-readable storage medium of claim 15, wherein:
the first non-subscriber device is a cellular device; and
the first non-subscriber contact information is a first cellular telephone number.

19. The non-transitory computer-readable storage medium of claim 15, wherein:
the first non-subscriber device is a land mobile radio (LMR) gateway; and
the first non-subscriber contact information is an internet protocol address of the LMR gateway.

20. The non-transitory computer-readable storage medium of claim 15, wherein:
the first non-subscriber device is one of a plurality of non-subscriber devices;
the receiving, from a first subscriber device, first non-subscriber contact information associated with a first non-subscriber device comprises receiving, from the first subscriber device, non-subscriber contact information associated with each non-subscriber device of the plurality of non-subscriber devices; and
the granting the first non-subscriber device access to the first POC talkgroup comprises granting the plurality of non-subscriber devices access to the first POC talkgroup.

21. The non-transitory computer-readable storage medium of claim 15, wherein:
the first POC talkgroup is one of a plurality of POC talkgroups; and
each POC talkgroup of the plurality of POC talkgroups is linked as part of a single virtual incident.

* * * * *

UNITED STATES PATENT AND TRADEMARK OFFICE
CERTIFICATE OF CORRECTION

| | | |
|---|---|---|
| PATENT NO. | : 11,997,568 B2 | Page 1 of 1 |
| APPLICATION NO. | : 17/844488 | |
| DATED | : May 28, 2024 | |
| INVENTOR(S) | : John Marvin Suzuki, Lorenzo Cruger, Jr. and James Lowell Teel, Jr. | |

It is certified that error appears in the above-identified patent and that said Letters Patent is hereby corrected as shown below:

In the Claims

At Column 10, Claim 1, Line number 38, please add the word --device-- after the word non-subscriber Signed and Sealed this
Ninth Day of July, 2024

Katherine Kelly Vidal
*Director of the United States Patent and Trademark Office*